US012623448B2

(12) United States Patent　　　　　(10) Patent No.:　US 12,623,448 B2
Ogushi　　　　　　　　　　　　　　　(45) Date of Patent:　May 12, 2026

(54) LAMINATING SYSTEM, IMAGE FORMING APPARATUS, AND RECORDING MEDIUM

(71) Applicant: Konica Minolta, Inc., Tokyo (JP)

(72) Inventor: Takehiro Ogushi, Hachioji (JP)

(73) Assignee: KONICA MINOLTA, INC., Tokyo (JP)

(*) Notice: Subject to any disclaimer, the term of this patent is extended or adjusted under 35 U.S.C. 154(b) by 174 days.

(21) Appl. No.: 18/364,239

(22) Filed: Aug. 2, 2023

(65) Prior Publication Data

US 2024/0075731 A1　　Mar. 7, 2024

(30) Foreign Application Priority Data

Sep. 6, 2022　(JP) ................................. 2022-141305

(51) Int. Cl.
　　　*B32B 41/00*　　　(2006.01)
　　　*G03G 15/00*　　　(2006.01)
(52) U.S. Cl.
　　　CPC ......... *B32B 41/00* (2013.01); *G03G 15/5012* (2013.01); *G03G 15/6541* (2013.01); *G03G 15/6573* (2013.01); *B32B 2041/04* (2013.01); *B32B 2309/04* (2013.01); *B32B 2309/72* (2013.01); *G03G 2215/00599* (2013.01)
(58) Field of Classification Search
　　　CPC . B32B 41/00; B32B 2041/04; B32B 2309/04; B32B 2309/72; B32B 37/12; B32B 38/1841; B32B 37/22; G03G 15/5012; G03G 15/6541; G03G 15/6573; G03G 2215/00599; G03G 15/6582; G03G 15/6591

USPC ..................... 156/60, 64, 350, 351, 378, 379
See application file for complete search history.

(56) References Cited

U.S. PATENT DOCUMENTS

2007/0053700 A1* 3/2007 Nishikata ........... G03G 15/6529
　　　　　　　　　　　　　　　　　　　　　　　　399/21
2021/0347589 A1* 11/2021 Suzuki ................... B65H 5/305

FOREIGN PATENT DOCUMENTS

JP　　　H06-23689 A　　2/1994
JP　　　2009-073668 A　　4/2009

* cited by examiner

*Primary Examiner* — Michael N Orlando
*Assistant Examiner* — Joshel Rivera
(74) *Attorney, Agent, or Firm* — LUCAS & MERCANTI, LLP

(57) ABSTRACT

A laminating system including: a laminator that performs lamination processing on a plurality of sheets that are conveyed; a second sheet conveyor that is on an upstream side of the laminator and that overlaps a leading end and a trailing end of respective sheets among the plurality of sheets conveyed from a first sheet conveyor including an image former or reduces an interval between the sheets so as not to generate a gap between the sheets; and a hardware processor that determines whether or not specific processing operated by temporarily interrupting an image forming operation occurs in a job, and changes an execution timing of the specific processing to a timing before a start or after an end of the job in response to determination that the specific processing occurs.

15 Claims, 5 Drawing Sheets

LAMINATING SYSTEM, IMAGE FORMING APPARATUS, AND RECORDING MEDIUM

CROSS-REFERENCE TO RELATED APPLICATIONS

The entire disclosure of Japanese Patent Application No. 2022-141305 filed on Sep. 6, 2022, including description, claims, drawings and abstract is incorporated herein by reference.

BACKGROUND

Technical Field

The present invention relates to a laminating system, an image forming apparatus, and a recording medium.

Description of Related Art

In the related art, a laminating apparatus that covers a printed material with a transparent resin film has been used. For example, a laminating apparatus using a long laminating member having an adhesive layer is known. In this laminating apparatus, the laminating member is continuously supplied in a longitudinal direction. The laminating apparatus overlaps and conveys a laminating member and sheets (media to be recorded) such as sheets of paper sequentially conveyed from the upstream side, and continuously laminates the sheets.

In particular, there is a hot laminator that causes a laminating member and a sheet to adhere to each other while being compressed and heated by a heating unit. By using the hot laminator, the laminating member comes into close contact with the sheet, and a gap at the boundary surface between the laminating member and the sheet is eliminated. As a result, the gloss of the sheet surface becomes constant, and a high-quality output product can be obtained.

As such a laminating apparatus, for example, Japanese Unexamined Patent Publication No. H 06-023689 discloses a configuration in which a trailing end of a preceding sheet and a leading end of a following sheet are overlapped with respect to sheets that are successively conveyed. Accordingly, the adhesive applied to the laminating member is prevented from directly coming into contact with the sheet conveyance section.

Further, Japanese Unexamined Patent Publication No. 2009-73668 has proposed a technology for controlling the conveyance speed and timing of a preceding sheet and a subsequent sheet in a laminating apparatus connected to an image forming apparatus. This laminating apparatus has a mechanism for reducing the interval between sheets conveyed one by one at an interval and conveying the sheets while overlapping the trailing end of a preceding sheet and the leading end of a succeeding sheet. As a result, even in a case where the laminating apparatus is connected to the image forming apparatus, a continuous lamination processing can be performed.

SUMMARY

However, the image forming apparatus on the upstream side of the laminating apparatus may temporarily interrupt the image forming operation and execute specific processing such as a correction operation in order to maintain the image. In this case, an interval between successively conveyed sheets is not constant. Therefore, in a case where the distance between the sheets is too large, it is difficult to stably overlap the sheets by the laminating apparatus in the related art. In a case where the sheets cannot be overlapped with each other, the adhesive of the laminating member comes into contact with not the sheet but the conveyance roller or the pressure roller, which may damage the conveying system member.

The present invention has been made in consideration of the above-described problem in the related art, and an object of the present invention is to prevent a defect in a lamination processing caused by specific processing involving interruption of an image forming operation.

To achieve at least one of the abovementioned objects, according to an aspect of the present invention, there is provided a laminating system including: a laminator that performs lamination processing on a plurality of sheets that are conveyed; a second sheet conveyor that is on an upstream side of the laminator and that overlaps a leading end and a trailing end of respective sheets among the plurality of sheets conveyed from a first sheet conveyor including an image former or reduces an interval between the sheets so as not to generate a gap between the sheets; and a hardware processor that determines whether or not specific processing operated by temporarily interrupting an image forming operation occurs in a job, and changes an execution timing of the specific processing to a timing before a start or after an end of the job in response to determination that the specific processing occurs.

To achieve at least one of the abovementioned objects, according to another aspect of the present invention, there is provided an image forming apparatus that is connectable to a laminating apparatus that performs lamination processing after overlapping a leading end and a trailing end of respective sheets or after reducing an interval between the sheets so as not to generate a gap between the sheets, the sheets being a plurality of conveyed sheets, the image forming apparatus comprising a hardware processor that determines whether or not specific processing operated by temporarily interrupting an image forming operation occurs in a job, and changes an execution timing of the specific processing to a timing before a start or after an end of the job in response to determination that the specific processing occurs.

To achieve at least one of the abovementioned objects, according to another aspect of the present invention, there is provided a non-transitory recording medium storing a computer-readable program for a computer that controls an image forming apparatus that is connectable to a laminating apparatus that performs lamination processing after overlapping a leading end and a trailing end of respective sheets or after reducing an interval between the sheets so as not to generate a gap between the sheets, the sheets being a plurality of conveyed sheets, the program causing the computer to determine whether or not specific processing operated by temporarily interrupting an image forming operation occurs in a job, and change an execution timing of the specific processing to a timing before a start or after an end of the job in response to determination that the specific processing occurs.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Below, with reference to the drawings, embodiments of a laminating system, an image forming apparatus, and a recording medium according to the present invention will be described. However, the scope of the invention is not limited to the disclosed embodiments.

Figure 1:
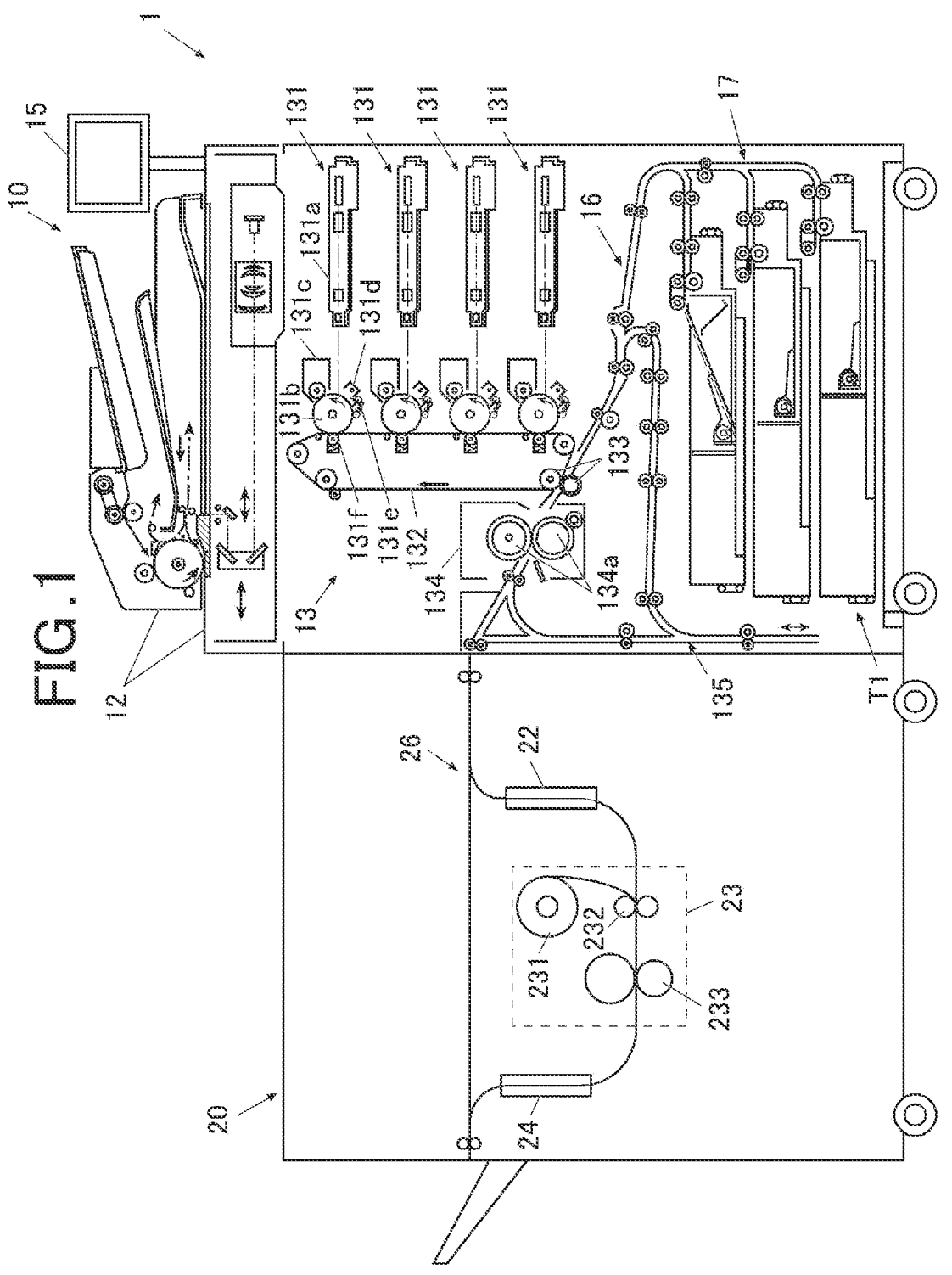
FIG. 1 is a schematic diagram illustrating an image forming system according to an embodiment of the present invention.
Figure 2:
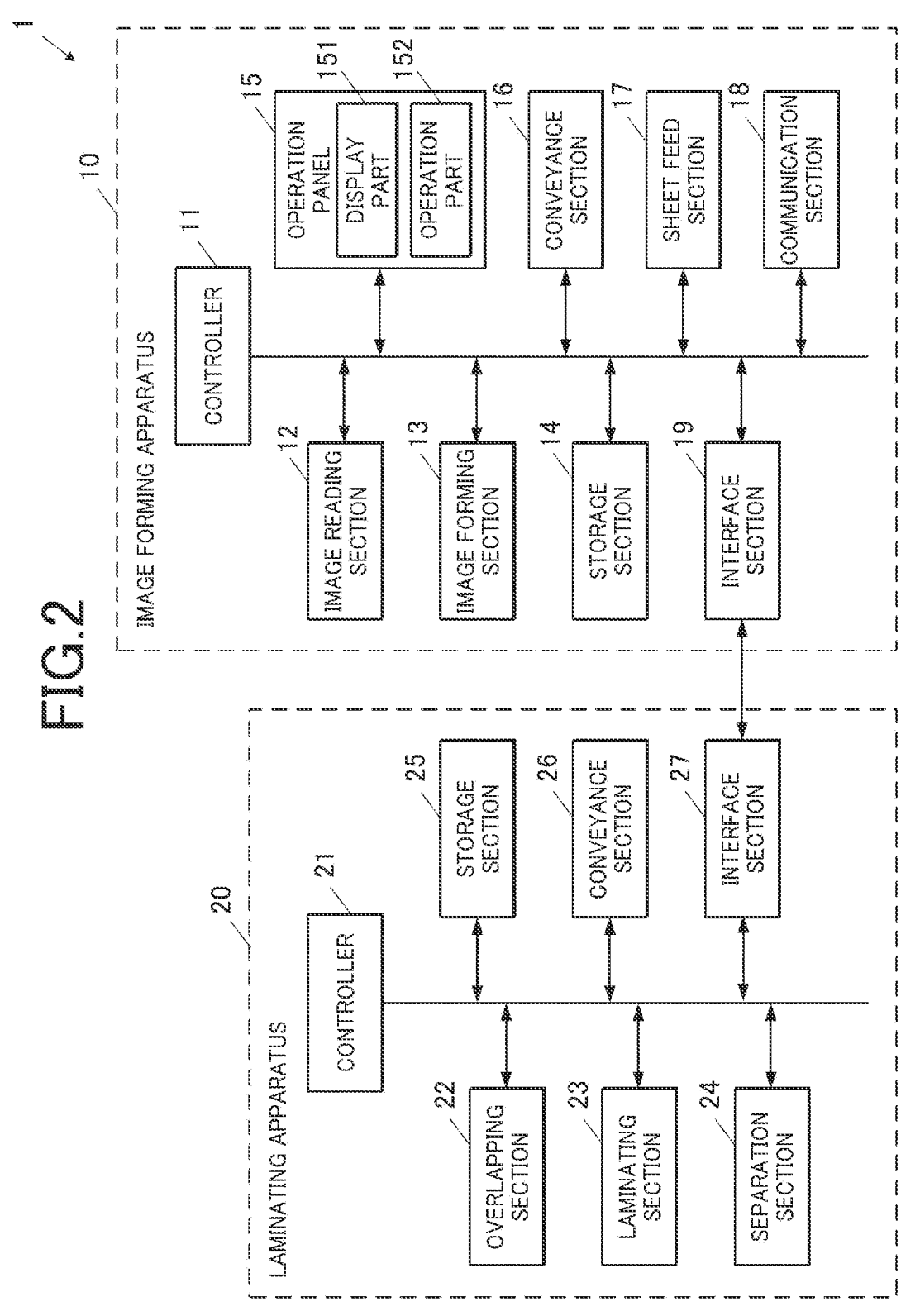
FIG. 2 is a block diagram showing a functional configuration of the image forming system.

[Configuration Of Image Forming System] FIG. 1 is a schematic configuration diagram of an image forming system 1 as a laminating system in the present embodiment. FIG. 2 is a block diagram showing a functional configuration of the image forming system 1. The image forming system 1 includes an image forming apparatus 10 and a laminating apparatus 20.

The image forming apparatus 10 forms an image on a sheet of paper serving as a sheet. The image forming apparatus 10 is connected to the laminating apparatus 20. The image forming apparatus 10 continuously delivers a plurality of sheets after image formation to the laminating apparatus 20.

The laminating apparatus 20 performs lamination processing on the sheet on which the image is formed in the image forming apparatus 10.

The image forming apparatus 10 includes a controller 11, an image reading section 12, an image forming section 13 (image former), a storage section 14, an operation panel 15 (a display part 151 and an operation part 152), a conveyance section 16, a sheet feed section 17, a communication section 18, an interface (IF) section 19, and the like.

The controller 11 includes a central processing unit (CPU), a random access memory (RAM), a read only memory (ROM), and the like. The CPU reads various programs stored in the ROM in response to an operation signal input from the operation part 152, and an instruction signal received by the communication section 18 or the interface section 19. The CPU develops the read various programs in the RAM and integrally controls the operation of the image forming apparatus 10 in cooperation with the various programs developed in the RAM.

The image reading section 12 scans and exposes an image of a document placed on a document plate or an auto document feeder (ADF) by an optical system of a scanning exposure device. The image reading section 12 obtains an image signal by reading reflected light from an image of a document using a line image sensor. The image signal is subjected to processing such as analog-to-digital (A/D) conversion, shading correction, and compression, and is then input to the controller 11 as image data.

The image forming section 13 forms an image on a sheet by an electrophotographic method based on image data read by the image reading section 12 or image data received from an external device. That is, the image forming section 13 forms a toner image on the sheet. The image forming section

13 forms an image composed of four colors of C, M, Y, and K on a sheet according to the pixel values of four colors of each pixel of the image data.

As shown in FIG. 1, the image forming section 13 includes four writing sections 131, an intermediate transfer belt 132, secondary transfer rollers 133, and a fixing section 134.

Four writing sections 131 are arranged in series (tandem) along the belt plane of the intermediate transfer belt 132. Each writing section 131 forms an image of each color of C, M, Y, and K. The writing sections 131 form images in different colors, but the writing sections 131 have the same configuration. Each of the writing sections 131 includes an optical scanning section 131*a*, a photoreceptor 131*b*, a developing section 131*c*, a charging section 131*d*, a cleaning section 131*e*, and a primary transfer roller 131*f*.

In image formation, the charging section 131*d* charges the photoreceptor 131*b* in each writing section 131. Thereafter, the optical scanning section 131*a* scans the photoreceptor 131*b* with the light flux emitted based on image data and forms an electrostatic latent image. When the developing section 131*c* supplies toner and develops an image, an image (monochrome toner image) is formed on the photoreceptor 131*b*.

The primary transfer rollers 131*f* of the four writing sections 131 sequentially transfer images formed on the photoreceptors 131*b* to the intermediate transfer belt 132 so that the images overlap (primary transfer). Thus, an image of each color (color toner image) is formed on the intermediate transfer belt 132. The intermediate transfer belt 132 is an image bearing member that is wound around a plurality of rollers to rotate. After the primary transfer, the cleaning section 131*e* removes the toner remaining on the photoreceptor 131*b*.

In the image forming section 13, a sheet is supplied from the sheet feed tray T1 in synchronization with the timing at which the image on the rotating intermediate transfer belt 132 reaches the position of the secondary transfer rollers 133. The secondary transfer rollers 133 include a pair of rollers. A first roller of the secondary transfer rollers 133 comes into pressing contact with the intermediate transfer belt 132. A second roller of the secondary transfer rollers 133 is one of a plurality of rollers around which the intermediate transfer belt 132 is wound. The pressing contact of the secondary transfer rollers 133 causes the image (color toner image) to be transferred (secondarily transferred) onto the sheet from the intermediate transfer belt 132. Thereafter, the sheet is conveyed to a fixing section 134 where the fixing processing is performed. The fixing processing is a process of fixing an image on a sheet by heating and pressing the sheet with the fixing roller 134*a*. When images are formed on both sides of the sheet, the sheet is conveyed to the inversion path 135, and the sheet surface is inverted. Thereafter, the sheet is fed again to the position of the secondary transfer rollers 133.

The storage section 14 is a nonvolatile storage section constituted by a hard disk drive (HDD), a solid state drive (SSD), or the like. The storage section 14 stores various programs, various setting data, and the like in a readable and writable manner from the controller 11.

The storage section 14 is provided with a counter for each type of specific processing. The counter counts the processed sheet count which is the number of processed sheets from the previous execution of the corresponding type of specific processing to the current time. The controller 11 increases the counter value by one every time an image is formed on one sheet. When the corresponding type of specific processing is executed, the controller 11 resets the counter value back to 0.

In addition, the storage section 14 stores the execution interval sheet count for each type of specific processing. The execution interval sheet count is the number of sheets that serve as an interval at which the corresponding type of specific processing is executed. The time when the counter value of a certain type of specific processing reaches the execution interval sheet count of the type of the specific processing is the execution timing of the type of the specific processing.

The specific processing is a process in which the image forming operation is temporarily interrupted in the job.

The specific processing is at least one of image stabilization processing, color registration adjustment processing, and toner deterioration prevention processing in the electrophotographic apparatus (image forming apparatus 10).

The image stabilization processing is processing for stabilizing image concentration. In the image stabilization processing, first, the controller 11 changes the developing output of the developing section 131c of the writing section 131 for each color, and forms a plurality of toner concentration detection patches having different toner concentrations on the intermediate transfer belt 132. Controller 11 acquires the toner concentration of each color on intermediate transfer belt 132 detected by a concentration sensor (not illustrated). The controller 11 feeds back, according to the detection result, to developing output of the developing section 131c corresponding to each color, and thereby performs control so that a stable toner concentration is always obtained during image formation.

The image stabilization processing is executed when the image formation is performed on the sheets of the "execution interval sheet count of the image stabilization processing" after the previous image stabilization processing is executed. In addition, the image stabilization processing is executed when a power switch of the image forming apparatus 10 is turned on, when a toner cartridge is replaced, or the like.

The color registration adjustment processing is a correction process for adjusting a deviation of an image position of each color (CMYK or the like) formed on a sheet. In the color registration adjustment processing, the controller 11 causes the writing section 131 of each color to form a color misregistration detection mark of each color on the intermediate transfer belt 132. The controller 11 calculates a misregistration amount between colors from positions of the color misregistration detection marks of the respective colors on the intermediate transfer belt 132 detected by a color misregistration detection sensor (not illustrated). The controller 11 performs feedback to each unit of the image forming section 13 based on the deviation amount, thereby aligning the image positions of the respective colors.

The color registration adjustment processing is executed in a case where image formation is performed on the sheets of "execution interval sheet count of the color registration adjustment processing" after the previous color registration adjustment processing is executed.

The toner deterioration prevention processing is processing (toner forced ejection processing) for ejecting toner in the developing section 131c of the writing section 131 of each color to prevent deterioration of toner. The toner remaining in the developing section 131c is stirred for a long time and is rubbed by other toners, carriers, and the like, and thus deteriorates and the charge amount decreases. In the toner deterioration prevention processing, controller 11 causes toner in developing section 131c to be ejected by forming a predetermined image pattern on intermediate transfer belt 132.

The toner deterioration prevention processing is executed in a case where image formation is performed on the sheets of "execution interval sheet count of the toner deterioration prevention processing" after the previous toner deterioration prevention processing is executed.

The operation panel 15 includes a display part 151 that displays various kinds of information to a user, and an operation part 152 that receives an operation input from the user.

The display part 151 may be, for example, a color liquid crystal display (LCD). The display part 151 displays an operation screen and the like in accordance with a display control signal input from the controller 11. The operation screen or the like includes various setting screens, various buttons, an operation status of each function, and the like.

The operation part 152 includes a touch panel provided on the screen of the display part 151 and various hard keys arranged around the screen of the display part 151. When a button displayed on the screen is pressed by a finger, a touch pen, or the like, the operation part 152 detects coordinates of the pressed position by a voltage value and outputs an operation signal associated with the detected position to the controller 11. The touch panel is not limited to a pressure-sensitive type and may be, for example, an electrostatic type, an optical type, or the like. When a hard key is pressed, the operation part 152 outputs an operation signal associated with the pressed key to the controller 11.

The conveyance section 16 includes a plurality of roller pairs. The conveyance section 16 conveys a sheet supplied by the sheet feed section 17 to the image forming section 13. The conveyance section 16 conveys the sheet on which an image has been formed by the image forming section 13 to the laminating apparatus 20.

The image forming section 13 and the conveyance section 16 function as a first sheet conveyor including the image forming section 13.

The sheet feed section 17 includes a sheet feed tray T1. The sheet feed section 17 feeds a sheet from a sheet feed tray T1 to the image forming section 13. Sheets of a predetermined paper type and size are stored in each sheet feed tray T1 for each sheet feed tray T1.

The communication section 18 is an interface that connects the image forming apparatus 10 to a communication network. The communication section 18 has a communication integrated circuit (IC), a communication connector, and the like. The communication section 18 transmits and receives various kinds of information to and from an external apparatus connected to the communication network using a predetermined communication protocol under the control of the controller 11. Furthermore, the communication section 18 can also input and output various kinds of information via a universal serial bus (USB).

The interface section 19 is an interface for transmitting and receiving data between the image forming apparatus 10 and the laminating apparatus 20.

The controller 11 (hardware processor) determines whether or not specific processing that operates by temporarily interrupting an image forming operation occurs in a job.

The controller 11 determines whether or not the type of the specific processing occurs in the job based on the type of the specific processing, the processed sheet count which is the number of processed sheets (counter value) from the previous execution of the type of the specific processing to the current time, the execution interval sheet count of the type of the specific processing, and the set sheet count for the job. Such determination processing is performed for each type of specific processing.

The set sheet count for a job is the number of sheets to be processed in the job.

The information of the job (hereinafter referred to as "job information") includes the set sheet count for the job. The job information is setting information indicating the content of a job.

The controller 11 uses the set sheet count for the job acquired from the job information for determination of whether or not each piece of specific processing occurs in the job.

For a certain type of specific processing, the controller 11 calculates a difference between the execution interval sheet count of the type of the specific processing and the number of processed sheets (processed sheet count) of the type of the specific processing as a predicted sheet count which is the number of sheets until the type of the specific processing is executed next.

In a case where the predicted sheet count of a certain type of specific processing is smaller than the set sheet count for the job, the controller 11 determines that the type of the specific processing occurs in the job. On the other hand, when the predicted sheet count of the certain type of specific processing is equal to or larger than the set sheet count for the job, the controller 11 determines that the type of the specific processing does not occur in the job.

When it is determined that the specific processing occurs in the job, the controller 11 changes the execution timing of the specific processing to before the start of the job.

Specifically, for a certain type of specific processing, when it is determined that the type of the specific processing will occur in a job, the controller 11 changes the execution timing of the type of specific processing to before the start of the job.

When the job includes the lamination processing, the controller 11 determines whether or not the specific processing occurs in the job. As a result, in a case where the job includes the lamination processing, when it is determined that the specific processing occurs in the job, the controller 11 changes the execution timing of the specific processing.

Figure 3:
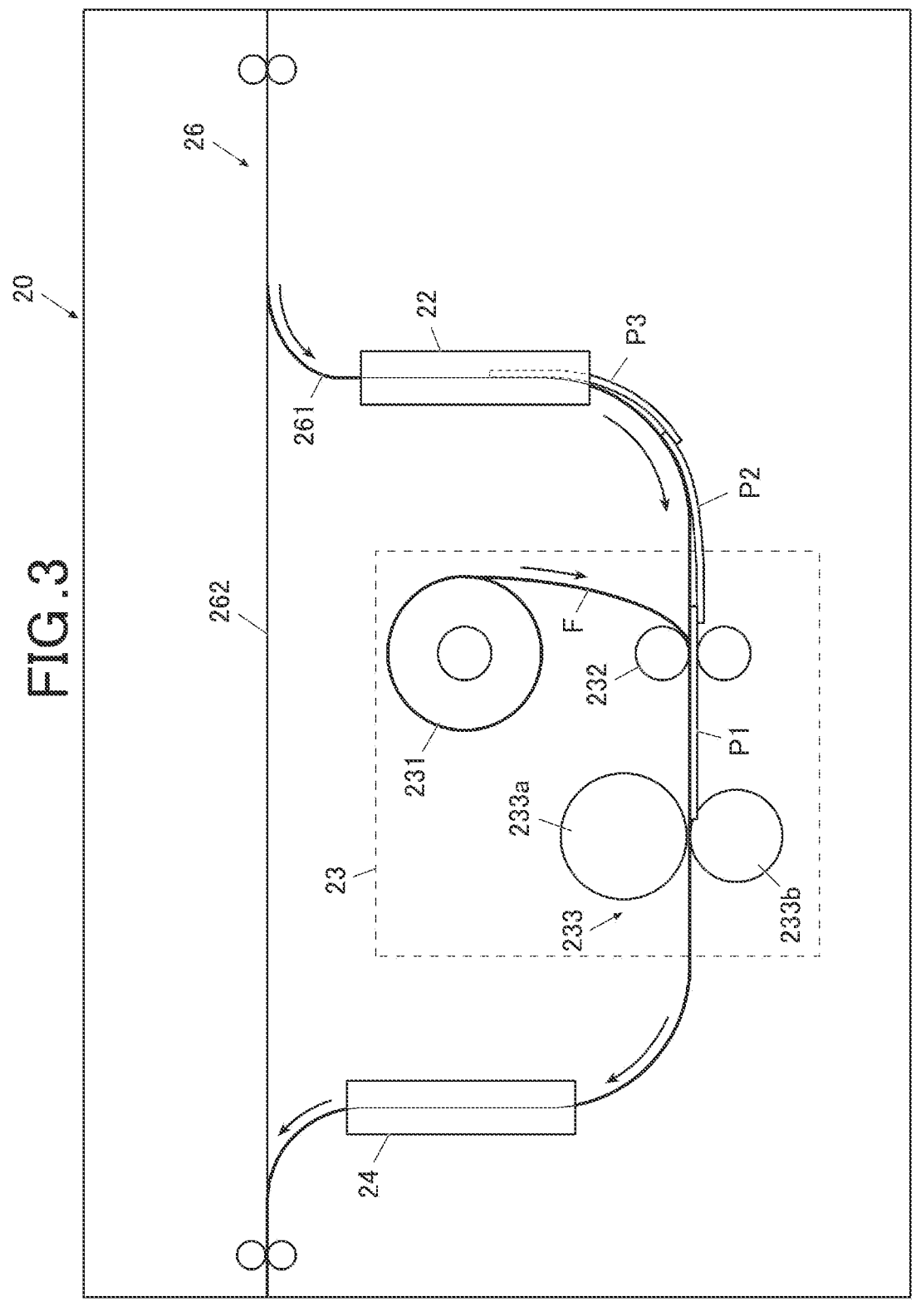
FIG. 3 is an enlarged view illustrating a configuration of a laminating apparatus.

The laminating apparatus 20 includes a controller 21, an overlapping section 22, a laminating section 23 (laminator), a separation section 24, a storage section 25, a conveyance section 26, an interface (IF) section 27, and the like. FIG. 3 is an enlarged view showing a configuration of the laminating apparatus 20.

The controller 21 includes a CPU, a RAM, a ROM, and the like. The CPU reads various programs stored in the ROM in response to an instruction signal received from the image forming apparatus 10 by the interface section 27. The CPU develops the read various programs in the RAM, and integrally controls the operation of the laminating apparatus 20 in cooperation with the various programs developed in the RAM.

As illustrated in FIG. 3, the overlapping section 22 is disposed upstream from the laminating section 23 in the sheet conveyance path.

The overlapping section 22 overlaps leading and trailing ends of sheets conveyed from a conveyance section 16 (a first sheet conveyor) including an image forming section 13 of the image forming apparatus 10. That is, the overlapping section 22 functions as a second sheet conveyor. More specifically, the overlapping section 22 puts the trailing end of the preceding sheet on the leading end of the following sheet by a predetermined amount to convey the sheets in a continuous belt shape. For example, as illustrated in FIG. 3, the overlapping section 22 cause the sheets P1 and P2 to be conveyed, such that the trailing end of the sheet P1 slightly overlaps (by a predetermined amount) with the upper portion of the leading end of the sheet P2. The overlapping section 22 conveys each of the sheets P2, P3 so that the trailing end of the sheet P2 slightly overlaps with the upper portion of the leading end of the sheet P3.

The laminating section 23 performs a lamination processing on a plurality of conveyed sheets. The laminating section 23 performs lamination processing by placing a film F (laminate film) having an adhesive layer on a plurality of sheets. The laminating section 23 continuously attaches a film F (a laminating member) to the side (the front side) of the sheet overlapped by the overlapping section 22 on which the image has been formed by the image forming apparatus 10. That is, the laminating section 23 performs lamination processing on only one side of the sheet.

The laminating section 23 includes a film roll 231, a bonding section 232, a laminate fixing section 233, and the like.

The film roll 231 is a roll of a film F including a transparent resin film layer and an adhesive layer. An adhesive that is thermally melted is applied to a side of the film F that comes into contact with the sheet to form an adhesive layer.

The film F is conveyed from the film roll 231 to a nip part of the bonding section 232.

The bonding section 232 includes a pair of rollers. The bonding section 232 sandwiches the sheet and the film F in a nip part formed by the pair of rollers, thereby bonding the adhesive layer of the film F to the surface of the sheet. As a result, the sheet and the film F are bonded together. Since the overlapping section 22 overlaps the leading ends and the trailing ends of the sheets successively conveyed, the adhesive applied to the film F is prevented from coming into contact with anything other than the sheets in a path subsequent to the bonding section 232.

The laminate fixing section 233 includes a heating roller 233a (heater) and a pressure roller 233b. The laminate fixing section 233 applies heating and pressurizing to the sheet and the film F bonded by the bonding section 232, to fix the film F on the sheet.

The heating roller 233a has a halogen heater or the like built-in, and functions as a heating section for heating a film F (laminate film) and a sheet in a state in which the sheet is overlaid with the film F.

The pressure roller 233b is pressed against the heating roller 233a by being urged upward by an urging member (not illustrated) such as a spring. Thus, a nip portion where the heating roller 233a and the pressure roller 233b are in surface contact with each other is formed.

The heating roller 233a and the pressing roller 233b melt the adhesive layer of the film F, adhere the melted adhesive layer to the surface of the sheet, and perform thermocompression bonding.

The separation section 24 inserts a cutting blade between the sheets (flat sheets) overlapped by the overlapping section 22 and cuts only the film F to separate the sheets from each other.

The storage section 25 is a non-volatile storage means including an HDD and an SSD. The storage section 25 stores various programs, various setting data, and the like in a readable and writable manner from the controller 21.

The conveyance section 26 includes a plurality of roller pairs. The conveyance section 26 conveys, in the laminating apparatus 20, a sheet conveyed from the image forming apparatus 10. In a case where the sheet is subjected to the lamination processing, the conveyance section 26 sequentially conveys the sheet to the overlapping section 22, the laminating section 23, and the separation section 24 via the conveyance path 261, and discharges the sheet subjected to the lamination processing to the outside. When lamination processing is not performed on a sheet, the conveyance section 26 conveys the sheet via a conveyance path 262. The conveyance path 262 does not pass through the overlapping section 22, the laminating section 23, and the separation section 24.

The interface section 27 is an interface for transmission and reception of data between the laminating apparatus 20 and the image forming apparatus 10.

[Operation Of Image Forming System] Next, operation of the image forming system 1 will be described.

Figure 4:
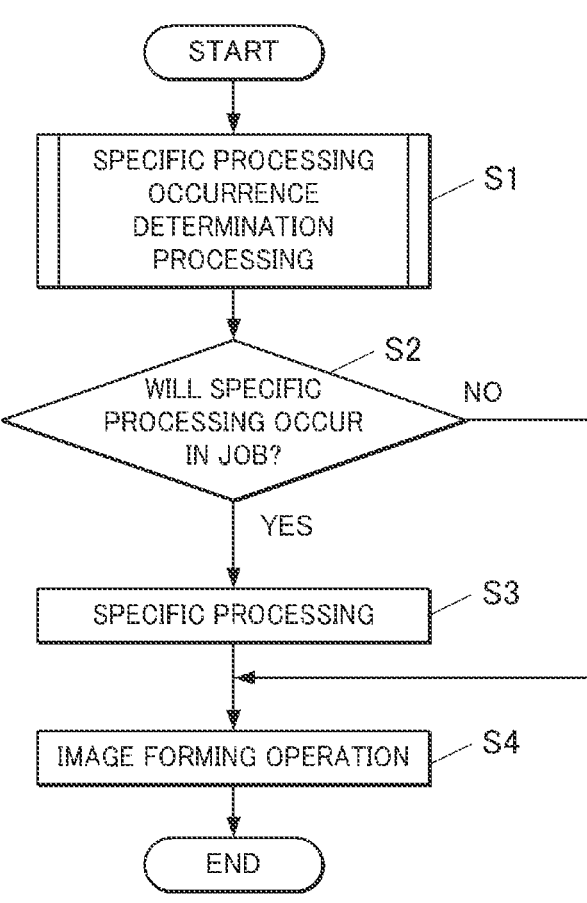
FIG. 4 is a flowchart illustrating job execution processing executed by the image forming apparatus.

FIG. 4 is a flowchart illustrating a job execution processing executed by the image forming apparatus 10. This processing is realized by software processing in cooperation between the CPU of the controller 11 of the image forming apparatus 10 and a program stored in the ROM.

First, the controller 11 of the image forming apparatus 10 executes the specific processing occurrence determination processing (step S1).

Figure 5:
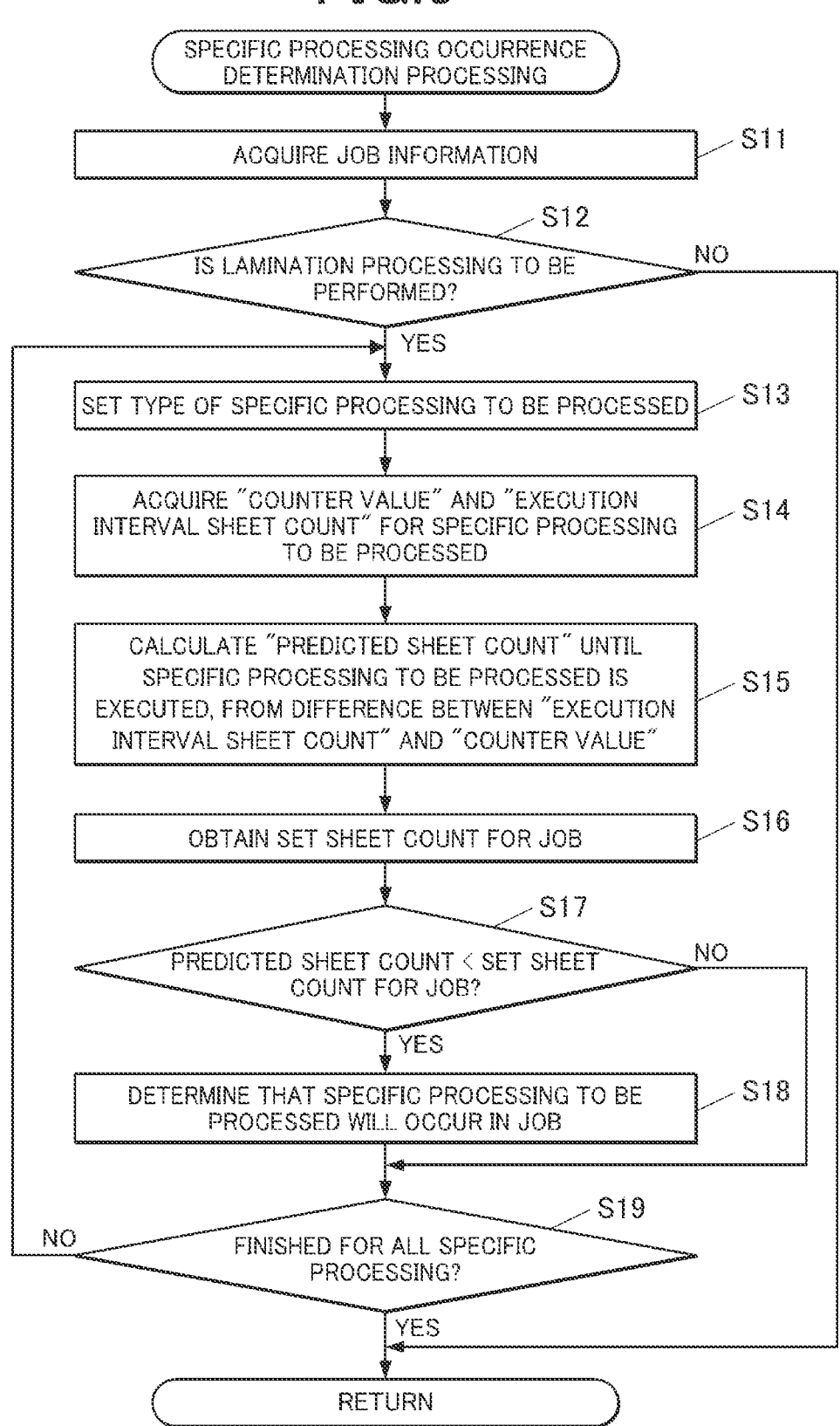
FIG. 5 is a flowchart illustrating the specific processing occurrence determination processing.

Here, with reference to FIG. 5, the specific processing occurrence determination processing will be described.

The controller 11 acquires job information from the external device via the communication section 18 (step S11). The job information includes image data, image forming conditions, a paper type, a size, and a basis weight of a sheet, whether or not to perform lamination processing, the set sheet count for a job, and the like. The job information may be generated based on image data read by the image reading section 12 and an operation instruction from the operation part 152.

Next, the controller 11 determines whether or not the lamination processing is specified based on the acquired job information (step S12).

In a case where the lamination processing is designated (step S12; YES), the controller 11 sets the type of specific processing to be processed (step S13). For example, the controller 11 sets one of the image stabilization processing, the color registration adjustment processing, and the toner deterioration prevention processing as the type of the specific processing to be processed.

Next, the controller 11 acquires the "counter value" and the "execution interval sheet count" from the storage section 14 with respect to the specific processing to be processed (step S14).

Next, the controller 11 calculates the "predicted sheet count" from the difference between the "execution interval sheet count" and the "counter value" for the specific processing to be processed (step S15). The "predicted sheet count" is the number of sheets until the specific processing to be processed is executed. The "predicted sheet count" indicates how many more sheets will be processed to execute the specific processing to be processed. That is, a value obtained by subtracting the "counter value" from the "execution interval sheet count" is the "predicted sheet count".

Next, the controller 11 obtains the "set sheet count for the job" from the job information (step S16).

Next, the controller 11 determines whether or not "predicted sheet count" is smaller than the "set sheet count for the job" for the specific processing to be processed (step S17).

In a case where the "predicted sheet count" is smaller than the "set sheet count for the job" (step S17; YES), the controller 11 determines that the specific processing to be processed will occur in the job (step S18). That is, if the job is started as it is, the specific processing is interrupted in the middle of the job.

After step S18 or in a case where the "predicted sheet count" is equal to or greater than the "set sheet count for job" in step S17 (step S17; NO), the controller 11 determines whether or not the processing has been finished for all the specific processing (step S19).

In a case where there is specific processing for which the processing has not ended (step S19; NO), the processing returns to step S13. Then, the processing of step S13 and subsequent steps is repeated with another type of specific processing as a processing target to be processed.

In step S19, when the processing is completed for all of the specific processing (step S19; YES), the specific processing occurrence determination processing ends.

In a case where the lamination processing is not designated in Step S12 (Step S12; NO), the specific processing occurrence determination processing ends.

After the specific processing occurrence determination processing, returning to FIG. 4, the controller 11 determines whether or not it has been determined that specific processing will occur in the job (step S2). Specifically, the controller 11 determines, for each type of specific processing, whether or not each specific processing is determined to occur in the job.

When it is determined that the specific processing occurs in the job (Step S2; YES), the controller 11 executes the specific processing determined to occur in the job (Step S3). That is, the controller 11 changes the execution timing of the specific processing determined to occur in the job to a timing before the start of the job.

After Step S3 or in Step S2, when it is determined that the specific processing does not occur in the job (Step S2; NO), the processing proceeds to Step S4. In step S4, the controller 11 executes an image forming operation (job) in accordance with job information (image forming conditions and the like). When the lamination processing is included in the job, the controller 11 transmits an instruction signal to execute the lamination processing to the laminating apparatus 20 via the interface section 19, and causes the laminating apparatus 20 to execute the lamination processing. In the laminating apparatus 20, when an instruction signal to execute the lamination processing is received via the interface section 27, the controller 21 controls each section to perform the lamination processing on the conveyed sheet. Specifically, controller 21 controls conveyance section 26 and overlapping section 22 to overlap leading and trailing ends of sheets conveyed from image forming apparatus 10 and convey the overlapped sheets to laminating section 23. The controller 21 controls the laminating section 23 to cause the plurality of conveyed sheets to be subjected to lamination processing. The controller 21 controls the separation section 24 to separate the overlapped sheets from each other.

Then, the job execution processing ends.

As described above, according to the present embodiment, in a case where it is determined that the specific processing occurs in the job, the controller 11 of the image forming apparatus 10 changes the execution timing of the specific processing not to be in the job. As a result, the controller 11 can prevent the adhesive of the film F from adhering to the conveyance path or the like due to the interval between the sheets which are successively conveyed by the occurrence of the specific processing. For this reason, the controller 11 can prevent a defect (damage to the conveyance system member or the like) of the lamination processing caused by the specific processing involving the interruption of the image forming operation.

For example, image stabilization processing, color registration adjustment processing, toner deterioration prevention processing, and the like can be set as the specific processing, and it can be determined whether or not the specific processing occurs in the job.

On the other hand, it is also conceivable to temporarily stop the supply and conveyance of the laminating member during the execution of the specific processing. However, in the case of a hot laminator, the adhesive is thermally fused at a fixing section to bond the laminating member to the sheet. Therefore, in a case where the laminating member remains, there is a concern that the material of the laminating member may deteriorate and the quality of the lamination processing may decrease.

In contrast, according to the present embodiment, the controller 11 avoids the occurrence of the specific processing in the job. Thus, in the laminating section 23 having the laminate fixing section 233 (heating roller 233*a*), the feeding of the film F (laminating member) is not stopped. Therefore, the controller 11 can prevent the deterioration of the material of the film F and the deterioration of the quality of the lamination processing due to the remaining of the film F.

Furthermore, in a laminating apparatus that performs a lamination processing on both sides of a sheet at the same time, even if there is a gap between sheets that are successively conveyed, since the laminating members adhere to each other, the adhesive of the film F does not adhere to the conveyance path and the like. Therefore, avoiding the occurrence of the specific processing in the job is particularly effective in the image forming system 1 including the laminating apparatus 20 that performs the lamination processing on only one side of the sheet.

In addition, in a case where the job does not include the lamination processing, a problem of the lamination processing due to the specific processing does not occur. For this reason, the controller 11 determines whether or not the specific processing occurs in the job only when the job includes the lamination processing, and thus it is possible to efficiently prevent a defect of the lamination processing due to the specific processing.

The description in the above embodiment is an example of the laminating system, the image forming apparatus, and the recording medium according to the present invention, and the present invention is not limited thereto. The detailed configuration and detailed operation of each apparatus and device constituting the system can be appropriately changed without departing from the scope of the present invention.

For example, in the above-described embodiment, when it is determined that the specific processing occurs in the job, the controller 11 of the image forming apparatus 10 changes the execution timing of the specific processing to the timing before the start of the job. Alternatively, when it is determined that the specific processing occurs in the job, the controller 11 may change the execution timing of the specific processing to a timing after the end of the job. That is, the controller 11 may wait for the execution of the specific processing until the job is completed.

In addition, in the above-described embodiment, the case where the leading end and the trailing end of the successively conveyed sheets are overlapped with each other by the overlapping section 22 has been described. Instead, the overlapping section 22 may narrow an interval so as not to generate a gap between successively conveyed sheets. The spacing between the sheets may be such that there is no gap or may be such that the adhesive layer of the film F is not exposed on the side opposite to the sheets.

Further, in the above-described embodiment, the case where the controller 11 of the image forming apparatus 10 determines whether or not the specific processing occurs in the job has been described. The determination as to whether or not the specific processing occurs in the job may be performed by any apparatus inside or outside of the image forming system 1. For example, the controller 21 of the laminating apparatus 20 may determine whether or not the specific processing occurs in the job. A server or the like that is connected to the image forming system 1 for data communication may determine whether or not the specific processing occurs in a job. In such a case, the apparatus that makes the determination acquires information required for the determination from the image forming apparatus 10 and, after the determination, transmits a result of the determination to the image forming apparatus 10. Examples of the information required for the determination include the type of the specific processing, the processed sheet count which is the number of processed sheets from the previous execution of the type of the specific processing to the current time, the execution interval sheet count of the type of the specific processing, and the set sheet count for the job. The controller 11 of the image forming apparatus 10 may change the execution timing of the specific processing to before the start or after the end of the job when it is determined that the specific processing occurs in the job based on the determination result.

Although embodiments of the present invention have been described and illustrated in detail, the disclosed embodiments are made for purposes of illustration and example only and not limitation. The scope of the present invention should be interpreted by terms of the appended claims.

The invention claimed is:

1. A laminating system comprising:
   a laminator that performs lamination processing on a plurality of sheets that are conveyed;
   a second sheet conveyor that is on an upstream side of the laminator and that overlaps a leading end and a trailing end of respective sheets among the plurality of sheets conveyed from a first sheet conveyor including an image former or reduces an interval between the sheets so as not to generate a gap between the sheets; and
   a hardware processor that
      determines whether or not a specific processing that operates by temporarily interrupting an image forming operation has an execution timing that will occur in a job to be performed, and
      changes the execution timing of the specific processing to a timing before a start or after an end of the job in response to determination that the specific processing occurs in the job.

2. The laminating system according to claim 1, wherein the image former forms a toner image on a sheet among the plurality of sheets.

3. The laminating system according to claim 1, wherein the laminator includes a heater that heats a laminate film and a sheet among the plurality of sheets in a state in which the sheet is overlaid with the laminate film.

4. The laminating system according to claim 1, wherein the laminator performs the lamination processing by placing a laminate film having an adhesive layer on sheets among the plurality of sheets.

5. The laminating system according to claim 1, wherein the laminator performs the lamination processing on only one side of a sheet among the plurality of sheets.

6. The laminating system according to claim 1, wherein the specific processing is at least one of image stabilization processing, color registration adjustment processing, and toner deterioration prevention processing in an electrophotographic apparatus.

7. The laminating system according to claim 1, wherein the hardware processor determines whether or not a type of the specific processing occurs in the job based on the type of the specific processing, a processed sheet count from previous execution of the type of the specific processing to a current time, an execution interval sheet count for the type of the specific processing, and a set sheet count for the job, and changes the execution timing of the type of the specific processing to the timing before the start or after the end of the job in response to determination that the type of the specific processing occurs in the job.

8. The laminating system according to claim 7, wherein the set sheet count for the job is included in information on the job, and the hardware processor uses the set sheet count for the job acquired from the information on the job to determine whether or not the type of the specific processing occurs in the job.

9. The laminating system according to claim 7, wherein the hardware processor calculates a difference between the execution interval sheet count and the processed sheet count as a predicted sheet count that is a sheet count until the type of the specific processing is executed next, and determines that the type of the specific processing occurs in the job in response to that the predicted sheet count is smaller than the set sheet count for the job.

10. The laminating system according to claim 1, wherein the hardware processor determines whether or not the specific processing occurs in the job, in response to that the job includes the lamination processing.

11. The laminating system according to claim 1, wherein the hardware processor changes the execution timing of the specific processing to a timing before the start of the job in response to the determination that the specific processing occurs in the job.

12. An image forming apparatus that is connectable to a laminating apparatus that performs lamination processing after overlapping a leading end and a trailing end of respective sheets or after reducing an interval between the sheets so as not to generate a gap between the sheets, the sheets being a plurality of conveyed sheets, the image forming apparatus comprising a hardware processor that determines whether or not a specific processing that operates by temporarily interrupting an image forming operation has an execution timing that will occur in a job to be performed, and changes the execution timing of the specific processing to a timing before a start or after an end of the job in response to determination that the specific processing occurs in the job.

13. A non-transitory recording medium storing a computer-readable program for a computer that controls an image forming apparatus that is connectable to a laminating apparatus that performs lamination processing after overlapping a leading end and a trailing end of respective sheets or after reducing an interval between the sheets so as not to generate a gap between the sheets, the sheets being a plurality of conveyed sheets, the program causing the computer to determine whether or not a specific processing that operates by temporarily interrupting an image forming operation has an execution timing that will occur in a job to be performed, and change the execution timing of the specific processing to a timing before a start or after an end of the job in response to determination that the specific processing occurs in the job.

14. The laminating system according to claim 1, wherein the hardware processor determines whether or not the specific processing will occur in the job by determining whether or not the execution timing of the special processing is scheduled to occur during execution of the job to be performed.

15. The laminating system according to claim 1, wherein the laminator performs the lamination processing by continuously attaching a film unrolled from a film roll onto the plurality of sheets.

* * * * *